United States Patent [19]
Jones

[11] 3,840,756
[45] Oct. 8, 1974

[54] GAIN CONTROL CIRCUIT USING SAMPLE AND HOLD FEEDBACK

[75] Inventor: William H. Jones, Oklahoma City, Okla.

[73] Assignee: Honeywell Information Systems, Inc., Waltham, Mass.

[22] Filed: Feb. 5, 1973

[21] Appl. No.: 329,517

[52] U.S. Cl. .................. 307/264, 330/29, 330/30 D, 330/139, 360/63, 360/67
[51] Int. Cl. .............................................. H03k 1/14
[58] Field of Search ....... 330/29, 35, 30 D, 69, 138, 330/139, 141; 179/100.4 A, 100.2 K; 307/264, 235 R

[56] References Cited

UNITED STATES PATENTS

| | | | |
|---|---|---|---|
| 3,327,236 | 6/1967 | Krossa et al. | 330/29 X |
| 3,441,866 | 4/1969 | Barber et al. | 330/29 |
| 3,488,604 | 1/1970 | Smilowitz | 330/29 |
| 3,536,858 | 10/1970 | Limbaugh et al. | 330/29 X |
| 3,679,986 | 7/1972 | Zaman | 330/29 X |

OTHER PUBLICATIONS

Naitoh et al., "A Mixer-Keyer Amplifier for Color Television," Journal of the SMPTE, Vol. 80, No. 7, pt. 1, July 1971, pp. 545–551.

*Primary Examiner*—James B. Mullins
*Attorney, Agent, or Firm*—Gerald R. Woods

[57] ABSTRACT

In a system for recovering data from a magnetic medium, an automatic gain control circuit uses a sample and hold feedback technique. A field effect transistor has source and drain terminals connected to a system amplifier in a gain-controlling configuration. During a read operation, the gate voltage for this transistor varies as a function of system output voltage; i.e., the output is continuously sampled. A capacitor in the feedback loop is charged during a read operation to a holding voltage. This holding voltage provides gate bias for the transistor between read operations to prevent gain swings at the start of new operations.

3 Claims, 2 Drawing Figures

GAIN CONTROL CIRCUIT USING SAMPLE AND HOLD FEEDBACK

BACKGROUND OF THE INVENTION

The present invention relates to magnetic memories and more particularly to an improved automatic gain control circuit for use in recovering previously recorded data from such memories.

Threshold circuits are commonly used in systems for recovering data previously recorded on a magnetic medium such as a disk, drum, or tape. The function of a threshold circuit is to pass only those signals having an amplitude greater than a threshold value while blocking all signals of lesser amplitudes. Since signals representing data should be stronger than electrical noise signals, threshold circuits ideally pass all data signals and block all noise signals.

However, the amplitude of both data and noise components of a read signal can vary for a number or reasons even if the data was recorded using a fixed write current. Magnetization characteristics can vary across the surface of any medium resulting in stronger magnetic fields in one area than in another. Also, the speed of the media relative to a transducer, and thus the rate of change of magnetic flux during a read operation, can vary due to variations in prime mover output. In the case of a magnetic disk driven at a nominally constant rotational velocity, the linear velocity of a particular track relative to a transducer also varies as a function of the radius of the track. Further, the strength of a read signal depends on the spacing between a read transducer and the media surface. Flying heads, which ride above a moving disk or drum on a boundary layer of air, rise and fall due to media surface imperfections and to media wobble during rotation. Of course, different transducers have different characteristics which can lead to variations in read signal strength.

At one extreme, conditions such as strong media magnetization characteristics, high media speed and low transducer/surface separation may cause both the noise and the data components of a read signal to exceed a fixed threshold level. Noise signals passed by the threshold circuits may be interpreted as data signals, leading to errors in the recovered data. At the other extreme, conditions such as weak magnetization characteristics, low media speed and high transducer/surface separation may produce a read signal so weak that neither noise components nor data components exceed the threshold level.

To overcome these problems, automatic gain control circuits have been used in prior art systems. These gain control circuits ideally maintain the amplitude of read signals at a constant amplitude in spite of variations in media speed, magnetization characteristics, etc. In the known prior art systems, the automatic gain control circuits are permanently connected to the system output through a negative feedback loop. For the reasons set forth below, permanently connected automatic gain control circuits may induce gain swings in the system output at the start of read operations.

If a new record is to be read from a disk memory following a write operation or the reading of a different record, a transducer must be driven to a position adjacent the track on which the new record is stored. Then an indexing operation must be performed. During these operations, all read pre-amplifiers are gated off, causing the system output signal to approach a zero level. Prior art gain-controlled systems attempt to compensate for the diminishing system output by increasing the system gain. When the read operation finally begins, the high gain which has been established tends to amplify noise signals to peak values exceeding the threshold level. A consequent and also adverse result is that the highly amplified signals, when fed back to the automatic gain control circuit, may induce a rapid reduction in system gain. Overcompensation might result in data signals being reduced to levels below the threshold level.

Gain adjustment problems also occur when a read operation follows a write operation. A write amplifier is normally connected to a transducer used for read/write operations at the input side of the read pre-amplifier. To keep strong write signals from overdriving the read pre-amplifier during write operations, a signal limiter is placed at the input to the read pre-amplifier. However, over-driving may still occur. As a consequence, the controlled gain of the data recovery system will fall during write operations to levels well below those required for ensuring read operations.

Summary of the Invention

To eliminate gain swings at the beginning of a read operation, an improved gain control circuit was invented. The improved gain control circuit includes a variable impedance connected to a system amplifier in a gain-controlling configuration. The improved gain control circuit further includes a sampling means which is connected between the variable impedance means and the output of the system. The sampling means varies the magnitude of the impedance as a function of the amplitude of the system output signals during a read operation. However, the sampling means includes a holding means which can hold the value of the impedance at a level dependent upon the level of a previously sampled output signal.

Description of the Drawings

While the specification concludes with claims particularly pointing out and distinctly claiming that which is regarded as the present invention, details of one embodiment of the invention may be more readily ascertained from the following detailed description when read in conjunction with the accompanying drawing wherein:

Detailed Description

Figure 1:
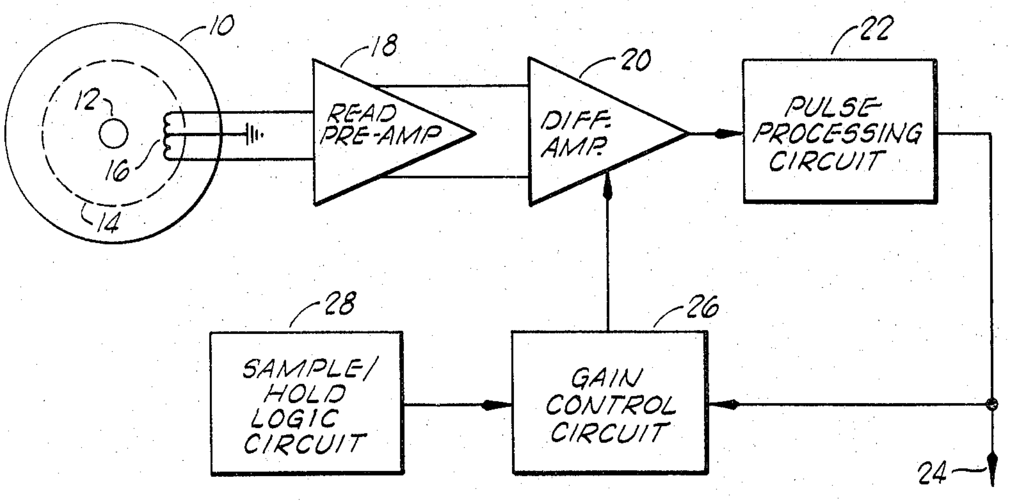
FIG. 1 is a block diagram of a data recovery system for a disk drive.

Referring now to FIG. 1, a magnetic storage media such as disk 10 is shown mounted on a spindle 12. Data is recorded on the surface of a magnetic disk 10 in concentric rings or tracks, such as track 14, by reversing the polarity of write current applied to a magnetic transducer 16 as the surface rotates under the transducer. Previously-recorded magnetic data is also recovered by transducer 16. Since the present invention may be described without reference to the write circuitry, none is shown. The signals generated by transducer 16 are applied to a read pre-amplifier 18 which can be a conventional fixed gain amplifier. The output of the pre-amplifier 18 is, in turn, applied to a variable gain differential amplifier 20 having its output connected to a pulse processing circuit 22. The details of the pulse processing circuit 22, which performs conventional pulse shaping functions, need not be disclosed in this application as they are not critical to the construction or operation of the present invention.

The output of the pulse processing circuit 22 is referred to as a system output signal and is applied to threshold and peak detection circuits (not shown) on the output side of an output terminal 24. A gain control circuit 26, to be discussed in some detail later, has an input connected to the system output terminal 24. Gain control circuit 26 has a second input connected to sample/hold logic circuits 28. For purposes of the present invention, the output of the sample/hold logic circuit 28 is either a high level signal which indicates a read operation is in progress or a low level signal which indicates no read operation is being performed.

Figure 2:
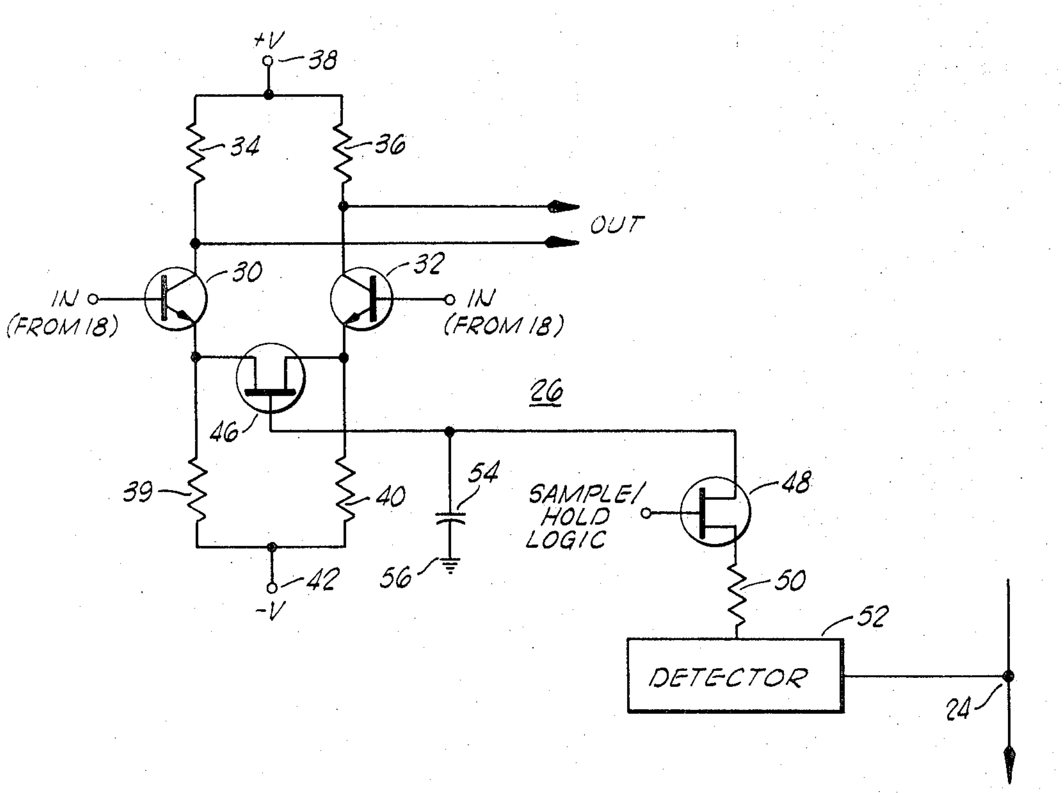
FIG. 2 is a schematic diagram showing the gain control circuit of FIG. 1 with the sample-and-hold feedback loop.

Gain control circuit 26 provides a continuous feedback signal which can vary the gain of differential amplifier 20 during a read operation. Between read operations, gain control circuit 26 holds the system gain at a fixed level to provide initial gain conditions at the start of the next read operation. The circuitry which permits this sample and hold operation is shown in detail in FIG. 2.

Referring to that figure, the differential amplifier 20 is shown as having a first stage consisting of a pair of NPN transistors 30 and 32 having collector terminals connected through resistances 34 and 36, respectively, to a positive voltage source 38. The emitter terminals of transistors 30 and 32 are similarly connected through emitter resistances 39 and 40, respectively, to a negative voltage source 42.

The differential amplifier, as described thus far, is a conventional one which may include more than one stage. A pair of output leads 44 is used to connect the first stage to the second stage (if any) of the amplifier. Since the remaining stages would also be conventional in construction, they are not illustrated.

The gain of the first stage of the differential amplifier is controlled by a variable impedance means such as a field effect transistor 46 having its source terminal connected to the emitter of one transistor and its drain terminal connected to the emitter of the other transistor in the differential amplifier 20. The gate terminal for the field effect transistor 46 is connected to the drain terminal of a second field effect transistor 48. The transistor 48 has its source terminal connected through a resistance 50 to a conventional detector 52. Detector 52 is basically a rectifier and a wide bandwidth filter which detects the envelope of the system output signal on terminal 24 and provides a varying dc voltage following the envelope. In addition to the elements discussed above, the gain control circuit 26 also includes a capacitor 54 having one terminal connected to the gate terminal of the transistor 46 and the other terminal connected to a reference voltage terminal such as ground terminal 56.

Automatic gain control circuits are electronic servo systems that may be stabilized with RC networks or filters. Capacitor 54 and resistor 50 form a network which provides a desired closed loop response. It will be recognized that the detector 52, resistor 50 and capacitor 54 may be altered is ways known to those skilled in the art to obtain various responses. Depending on the characteristics of the desired response, it may not be necessary to include a resistor such as resistor 50.

The operation of the circuit described above is as follows. During a read operation, the read signals appearing on the system output terminal 24 are fed back to detector 52. The varying dc signal produced by detector 52 is applied through the resistor 50 to the source terminal of the field effect transistor 48 which is biased to its conductive state by a high level signal from the sample/hold logic circuit 28. Thus, current applied to the source terminal for transistor 48 is transmitted to the junction of the gate terminal of transistor 46 and of upper terminal of the capacitor 54. The charge which accumulates on capacitor 54 during the read operation is proportional to the feedback voltage. The greater the feedback voltage during a read operation, the greater the charge on the capacitor 54.

At the end of a read operation, a low level signal from the sample/hold logic circuit 28 biases field effect transistor 48 to a non-conductive state effectively opening the circuit between the upper terminal of capacitor 54 and the resistor 50. As long as transistor 48 is non-conductive, the gate voltage for field effect transistor 46 is held at the voltage across capacitor 54. This fixed voltage results in a fixed source-to-drain impedance for transistor 46 which in turn fixes the gain of the differential amplifier 20. Thus, during writing, transducer positioning and indexing operations, the system gain is held at a level dependent upon the feedback voltage during the preceding read operation. While the exact gain needed in the course of the next read operation may not match the gain fixed during the interval between read operations, the difference is slight enough to prevent the gain swings which prior ar automatic gain control circuits were susceptible to.

While there has been described what is believed to be a preferred embodiment of the present invention, variations and modifications in the invention will occur to those skilled in the art once they become familia with the principles of the invention. Therefore, it is intended that the appended claims shall be construed to include all such variations and modifications as fall within the true spirit and scope of this invention.

What is claimed is:

1. For processing electrical read signals in a system having a transducer for writing data onto or for reading data signals or indexing signals from an adjacent data storage medium and further having a differential amplifier in circuit with the transducer, an improved automatic gain control circuit comprising:

a. means for detecting the amplitude of signals on the output side of the differential amplifier;

b. a field effect transistor having its source and drain terminals connected to the differential amplifier in a gain controlling configuration;

c. a charge storing device connected between the gate terminal of said field effect transistor and a reference voltage terminal; and d. switching means connected in series between the gate terminal of said field effect transistor and the output of said detecting means

1. for connecting the gate terminal and the detecting means during the processing of read data signals to thereby vary the source-drain resistance of the field effect transistor as a function of the detected signals, and 2. for isolating the gate terminal from the detecting means during data write operations to fix the source-drain resistance as a function of the charge on said charge storing device.

2. An improved gain control circuit as recited in claim 1 wherein said switching means comprises a second field effect transistor having its source and drain terminals connected in series between the gate terminal of the first mentioned transistor and the output of said detecting means and its gate terminal connected to a source of logic signals.

3. An improved gain control circuit as recited in claim 2 wherein said charge storing device comprises a capacitor.

* * * * *